United States Patent
Alland

(10) Patent No.: US 8,441,394 B2
(45) Date of Patent: May 14, 2013

(54) SYSTEM AND METHOD FOR DETECTING OBSTRUCTIONS AND MISALIGNMENT OF GROUND VEHICLE RADAR SYSTEMS

(75) Inventor: Stephen W. Alland, Newbury Park, CA (US)

(73) Assignee: Delphi Technologies, Inc., Troy, MI (US)

( * ) Notice: Subject to any disclaimer, the term of this patent is extended or adjusted under 35 U.S.C. 154(b) by 57 days.

(21) Appl. No.: 13/179,716

(22) Filed: Jul. 11, 2011

(65) Prior Publication Data

US 2013/0015999 A1     Jan. 17, 2013

(51) Int. Cl.
    *G01S 13/93* (2006.01)

(52) U.S. Cl.
    USPC .............. 342/70; 340/435; 340/436; 340/903

(58) Field of Classification Search ............... 342/70–72; 340/435–436, 903; 701/301
    See application file for complete search history.

(56) References Cited

U.S. PATENT DOCUMENTS

| | | | |
|---|---|---|---|
| 4,536,763 A * | 8/1985 | von Pieverling | 342/107 |
| 4,926,171 A * | 5/1990 | Kelley | 340/961 |
| 5,122,796 A * | 6/1992 | Beggs et al. | 340/904 |
| 5,166,681 A * | 11/1992 | Bottesch et al. | 340/933 |
| 5,670,935 A * | 9/1997 | Schofield et al. | 340/461 |
| 5,959,570 A | 9/1999 | Russel | |
| 6,081,223 A * | 6/2000 | Kitahara et al. | 342/70 |
| 6,215,438 B1 * | 4/2001 | Oswald et al. | 342/70 |
| 6,266,005 B1 * | 7/2001 | Schneider | 342/123 |
| 6,445,337 B1 * | 9/2002 | Reiche | 342/104 |
| 6,469,659 B1 | 10/2002 | Lajiness et al. | |
| 6,611,227 B1 | 8/2003 | Nebiyeloul-Kifle et al. | |
| 6,765,523 B2 * | 7/2004 | Ono | 342/70 |
| 7,365,676 B2 * | 4/2008 | Mende | 342/70 |
| 7,397,351 B1 * | 7/2008 | Rubin et al. | 340/435 |
| 7,532,153 B2 * | 5/2009 | Nagasaku et al. | 342/104 |
| 7,679,498 B2 * | 3/2010 | Pawlicki et al. | 340/435 |
| 7,864,099 B2 * | 1/2011 | Colburn et al. | 342/70 |
| 7,973,700 B2 * | 7/2011 | Gohl | 342/70 |
| 8,031,062 B2 * | 10/2011 | Smith | 340/438 |
| 2001/0026237 A1 * | 10/2001 | Okai et al. | 342/70 |
| 2002/0005778 A1 * | 1/2002 | Breed et al. | 340/435 |
| 2002/0180633 A1 * | 12/2002 | Nakanishi et al. | 342/70 |
| 2003/0011507 A1 * | 1/2003 | Kondo et al. | 342/70 |
| 2003/0052814 A1 * | 3/2003 | Corbrion et al. | 342/104 |

(Continued)

FOREIGN PATENT DOCUMENTS

| DE | 10 2009 032124 | 1/2011 |
|---|---|---|
| EP | 1 467 223 | 10/2004 |

OTHER PUBLICATIONS

European Search Report dated Oct. 24, 2012.

*Primary Examiner* — John B Sotomayor
(74) *Attorney, Agent, or Firm* — Lawrence D. Hazelton

(57) ABSTRACT

A system, controller, antenna, and method for detecting obstruction and misalignment of a ground vehicle radar having an antenna configured to detect objects in a first direction characterized as being substantially parallel to a horizontal plane about the ground vehicle, and detect objects in a second direction characterized as being toward a roadway surface proximate to the ground vehicle. The second direction radar return from the roadway is expected to have certain characteristics. If the characteristics are outside of a predetermined window, then obstruction and/or misalignment of the first direction and the second direction is likely, and so the radar may not reliably detect an object in the first direction, such as a vehicle in an adjacent lane.

14 Claims, 2 Drawing Sheets

U.S. PATENT DOCUMENTS

| | | | |
|---|---|---|---|
| 2004/0145512 A1* | 7/2004 | Takano et al. | 342/70 |
| 2005/0017891 A1 | 1/2005 | Kuroda et al. | |
| 2005/0062641 A1* | 3/2005 | Kakishita et al. | 342/70 |
| 2005/0116854 A1 | 6/2005 | Beez et al. | |
| 2005/0280552 A1* | 12/2005 | DiPiazza | 340/905 |
| 2006/0139206 A1* | 6/2006 | Nagasaku et al. | 342/104 |
| 2006/0158369 A1* | 7/2006 | Shinoda et al. | 342/70 |
| 2008/0088499 A1* | 4/2008 | Bonthron et al. | 342/104 |
| 2009/0146865 A1* | 6/2009 | Watanabe et al. | 342/27 |
| 2011/0234449 A1* | 9/2011 | Haberland | 342/70 |
| 2011/0285571 A1* | 11/2011 | Jeong et al. | 342/27 |
| 2012/0044093 A1* | 2/2012 | Pala | 340/963 |

* cited by examiner

SYSTEM AND METHOD FOR DETECTING OBSTRUCTIONS AND MISALIGNMENT OF GROUND VEHICLE RADAR SYSTEMS

TECHNICAL FIELD OF INVENTION

The invention generally relates to ground vehicle radar systems, and more particularly relates to a system where a ground directed radar beam is used to determine if a horizontal directed radar beam is obstructed and/or misaligned.

BACKGROUND OF INVENTION

The operation of ground based radars, such as onboard automotive radars for detecting other vehicles in the same lane or an adjacent lane, can be impaired if the radar is blocked or misaligned in elevation angle. The radar can be blocked, for example, by layer of snow, slush, or mud on a radar dome (radome), or other secondary surface in the path of the radar signal. The radar beam can be misaligned in elevation, for example, during installation in the assembly plant, during replacement at dealerships, during operation due to vehicle loading, or following a collision. Blockage or vertical misalignment can impair the ability of the radar to detect objects to a point where operation of the system is compromised. In addition, it is sometimes a requirement that such radar systems are able to detect blockage or vertical misalignment so a vehicle operator can be informed that the radar system may not be operating properly.

Blockage detection techniques have been proposed that include: direct detection of the blockage layer using the same radar antenna elements used to detect objects about the ground vehicle, signal analysis techniques that analyze the amplitude or other waveform attributes of signals reflected by objects moving near the ground vehicle, and analyzing signals reflected by stationary objects. However, each of the above techniques has limited ability to reliably detect blockage. For example, the distance from the antenna to the blockage layer is typically less than the minimum range of the radar, and so is difficult to distinguish from low frequency leakage signals. Leakage signal cancellation has been found to be problematic due to unit to unit variation of radar system installations, and due to changes in ambient temperature. Furthermore, direct detection of a blockage layer may only indicate a signal reflection component caused by the blockage layer, and so may not provide an indication of signal absorption or loss caused by the blockage. As such, direct detection of the blockage layer may not be useful to determine total signal loss due to the blockage layer and so may not be useful to compensate or correct reflection signals from other objects.

Simple amplitude analysis of signals reflected by unknown objects is problematic due to the wide variation in reflectivity of unknown targets. Time averaging of reflected signals has been suggested, but it leads to undesirable signal latency. Current techniques of analyzing signals reflected by stationary objects include those using a fixed frequency waveform to enhance the signal spectrum, however, a limitation is that blockage detection then requires host vehicle motion, that is, blockage detection is not available when the host vehicle is stationary. It has been observed that the aforementioned techniques for blockage detection suffer from a high rate of missed or false blockage detections. Excessive latency can be an issue as well. Blockage techniques using a fixed frequency CW waveform cannot detect blockage when the host vehicle is stopped.

Furthermore the aforementioned techniques are not useful to detect vertical misalignment. Suggestions for detecting vertical misalignment include: using accelerometers to detect vertical motion and pitch angle changes, using vertical beam scanning to measure object elevation angle, and using radar image processing to analyze the range extent of the road edge. However, these suggestions undesirably increase cost.

SUMMARY OF THE INVENTION

In general, a system and method for detecting obstructions and/or misalignment of a ground vehicle based radar system are described herein. A horizontally directed radar beam for detecting objects near a ground vehicle may be determined to be obstructed or misaligned by analyzing radar reflection signals from a second radar beam directed toward the ground near the ground vehicle. In this manner the signal reflected from the ground in the second radar beam provides a reliable target for the purpose of detecting obstruction and/or misalignment.

In accordance with one embodiment of this invention, a ground vehicle radar system configured to be installed on a ground vehicle is provided. The system includes an antenna and a controller. The antenna is configured to be installed at an antenna location on the ground vehicle for detecting objects about the ground vehicle. The antenna is configured to detect objects in a first direction characterized as being substantially parallel to a horizontal plane about the ground vehicle, and detect objects in a second direction characterized as being toward a location on a roadway surface proximate to the ground vehicle. The controller is configured to be coupled to the antenna in a manner effective to receive a first antenna signal indicative of a first radar reflection from an object located in the first direction, and a second antenna signal indicative of a second radar reflection from an object located in the second direction. The controller is further configured to determine when the first direction is blocked by an obstruction proximate to the antenna location based on the second antenna signal.

In another embodiment of the present invention, a ground vehicle radar antenna configured to be installed at an antenna location on a ground vehicle for detecting objects about the ground vehicle is provided. The antenna includes a first receive element and a second receive element. The first receive element is configured to receive a first radar reflection from a first direction characterized as being substantially parallel to a horizontal plane about the ground vehicle. The second receive element is configured to receive a second radar reflection from a second direction characterized as being toward a location on a roadway surface proximate to the ground vehicle.

In yet another embodiment of the present invention, a controller for ground vehicle radar system is provided. The controller includes a first input, a second input, and a processor. The first input is configured to receive a first antenna signal indicative of a first radar reflection from a first direction characterized as being substantially parallel to a horizontal plane about the ground vehicle. The second input is configured to receive a second antenna signal indicative of the second radar reflection from a second direction characterized as being from a location on a roadway surface proximate to the ground vehicle. The processor is configured to determine that the first direction is blocked by an obstruction proximate to the antenna location based on the second antenna signal.

In yet another embodiment of the present invention, a method of operating a ground vehicle radar system is provided. The method includes the step of providing an antenna configured to be installed at an antenna location on a ground vehicle for detecting objects about the ground vehicle. The antenna is configured to detect objects in a first direction characterized as being substantially parallel to a horizontal plane about the ground vehicle, and detect objects in a second direction characterized as being toward a location on a roadway surface proximate to the ground vehicle. The method also includes the steps of receiving a first antenna signal and receiving a second antenna signal. The method also includes the step of determining when the first direction is blocked by an obstruction proximate to the antenna location based on the second antenna signal.

Further features and advantages of the invention will appear more clearly on a reading of the following detailed description of the preferred embodiment of the invention, which is given by way of nonlimiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
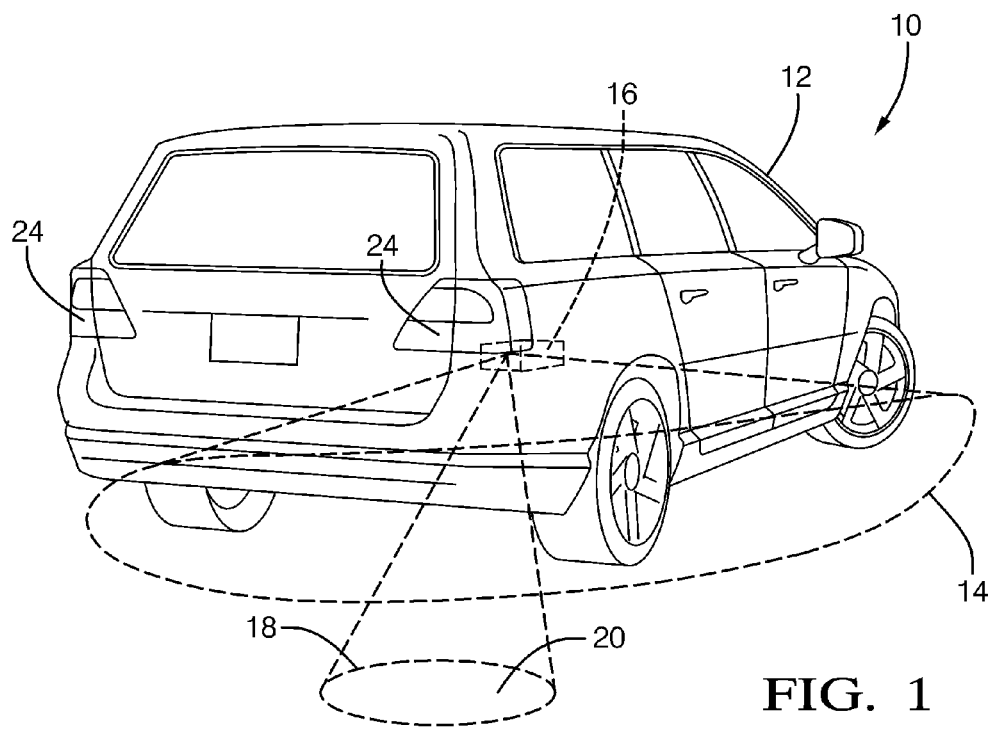
FIG. 1 is a perspective view of a vehicle equipped with a radar system in accordance with one embodiment.

FIG. 1 illustrates a nonlimiting example of a ground vehicle radar system 10, hereafter often system 10, installed on a ground vehicle 12, hereafter often vehicle 12. In general, the system 10 is configured to detect objects about the vehicle 12 residing in a first radar beam pattern 14. In this nonlimiting example, the first radar beam pattern 14 originates from an antenna location 16 located at the rear corner of the vehicle 12. The first radar beam pattern 14 in this example is configured to detect objects behind or beside the vehicle 12 such as other vehicles occupying traveling in a roadway lane adjacent the lane presently occupied by the vehicle 12. This area is typically not easily observed by an operator of the vehicle 12 with conventional rearview and sideview minors, and so is sometimes referred to as the blind spot. The system 10 is also configured to detect objects residing in a second radar beam pattern 18, originating from approximately the same antenna location 16, but directed toward a location on a roadway surface proximate to or close by the vehicle 12, for example directed downward at about a 45 degree angle toward the roadway and defining a second beam detection area 20 having an area size of about a 1 square meter when projected onto the road surface. As will become apparent in the following discussion, since the first radar beam pattern 14 and the second radar beam pattern 18 originate from about the same antenna location 16 on the vehicle 12, and the antennas for each beam are arranged so both radar beam patterns pass through substantially the same surface region on the vehicle 12 adjacent the antenna location 16, the second radar beam pattern 18 may be particularly useful to detect obstructions overlying that surface region, obstructions such as snow, mud, dirt, or any other obstruction that may interfere with detecting object residing in the first radar beam pattern 14. The system 10 may also be configured to alert an operator of the vehicle 12 that the system 10 may not be able to detect an object residing in the first radar beam pattern 14.

Figure 2:
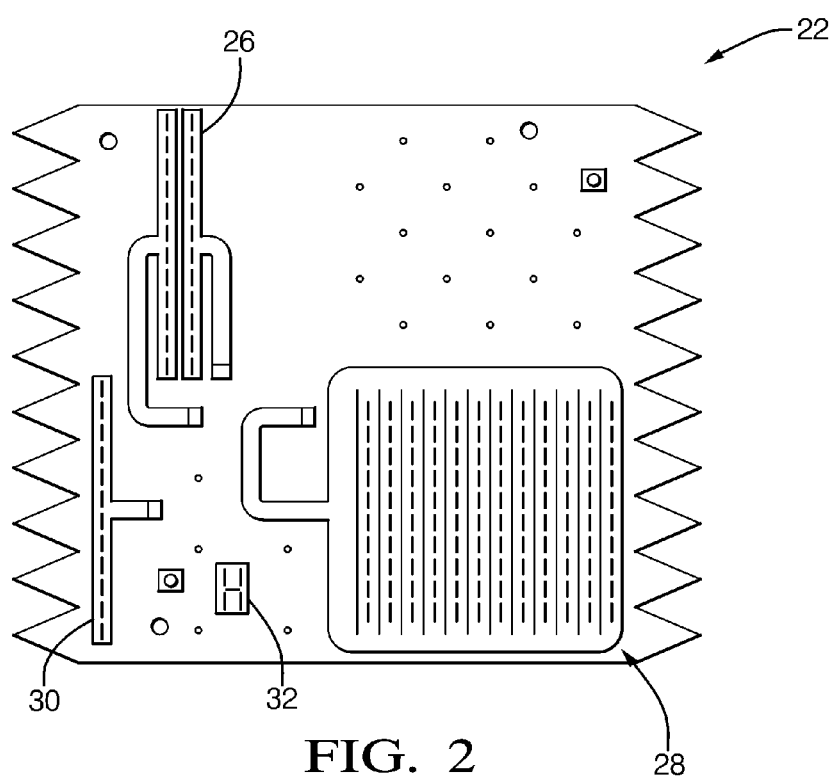
FIG. 2 is a top view of an antenna used in the radar system of FIG. 1 in accordance with one embodiment.

FIG. 2 illustrates a nonlimiting example of an antenna 22 suitably configured to be installed at an antenna location 16 on the ground vehicle 12 for detecting objects about the ground vehicle 12. The antenna 22 may be configured to detect objects in a first direction characterized as being substantially parallel to a horizontal plane about the ground vehicle, for example within the first radar beam pattern 14 shown in FIG. 1. The antenna 22 may also be configured to detect objects in a second direction characterized as being toward a location on a roadway surface proximate to the ground vehicle 12, for example, within the second radar beam pattern 18 shown in FIG. 1. As such, the system 10 is able to detect reflections from the roadway itself. In general, the roadway provides a relatively reliable reference target for detection as the roadway is generally less variable than other objects in the environment. The antenna 22 may be configured to be installed at the antenna location 16 on a ground vehicle 12 for detecting objects about the ground vehicle, for example by including the antenna 22 as part of a taillight assembly 24. In the description that follows, the antenna 22 is described as being part of the taillight assembly only for the purpose of explanation and not limitation. It is recognized that the antenna 22 may be suitably mounted behind a layer of plastic forming the bumper fascia.

Referring again to FIG. 2, the antenna 22 may include a first plurality of suitably sized antenna slots arranged in a manner known to those skilled in the art to form a first receive element 26 configured to receive a first radar reflection from the first direction described above. The antenna 22 may also include a second plurality of antenna slots arranged in a manner known to those skilled in the art to form a second receive element 28 configured to receive a second radar reflection from the second direction described above. The antenna 22 may also be configured to radiate electromagnetic energy in order to produce the first and/or second radar reflections. The antenna 22 may have a single, general purpose transmit element that transmits electromagnetic energy in a pattern that encompass both the first radar beam pattern 14 and the second radar beam pattern. However, in order to minimize the total amount of electromagnetic energy radiated and/or isolate the road surface return in the second radar beam pattern 18 from other objects in the environment, the antenna 22 may preferably include distinct transmit elements optimized for the first radar beam pattern 14 and the second radar beam pattern 18. For example, the antenna 22 may include a third plurality of antenna slots to form a first transmit element 30 configured to transmit electromagnetic energy in the first direction, and so radiate electromagnetic energy in a pattern corresponding to the first radar beam pattern 14. The antenna 22 may also include a fourth plurality of antenna slots to form a second transmit element 32 configured to transmit electromagnetic energy in the second direction, and so radiate electromagnetic energy in a pattern corresponding to the second radar beam pattern 18.

Figure 3:
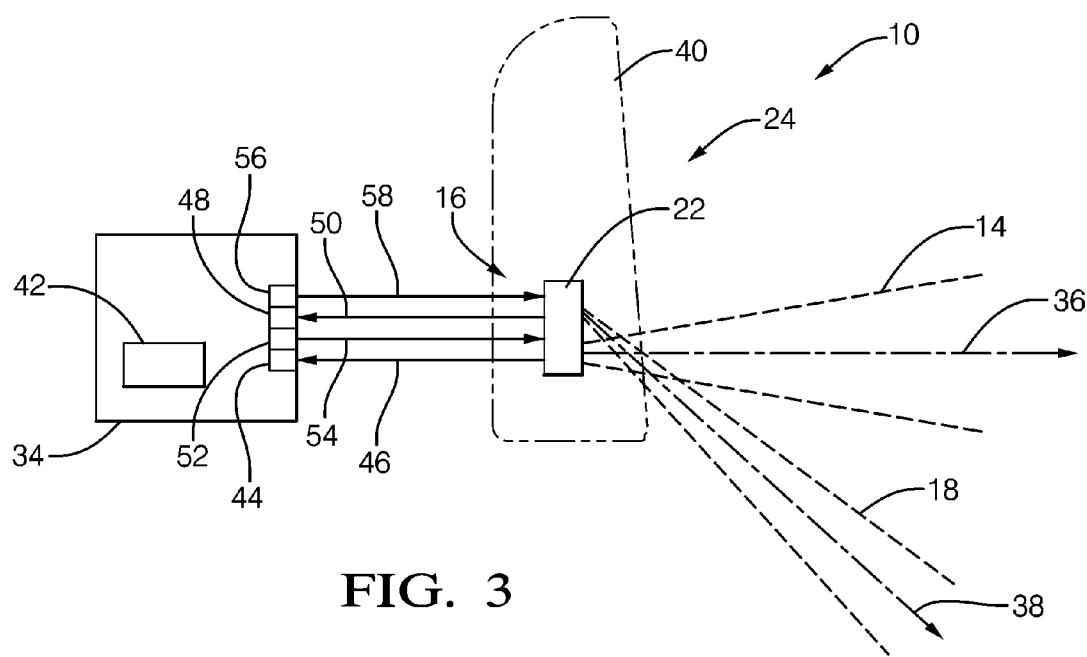
FIG. 3 is a diagram of the radar system of FIG. 1 in accordance with one embodiment.

FIG. 3 illustrates a nonlimiting example of the system 10. The system 10 may include a controller 34 coupled to the antenna 22. The antenna 22 is illustrated as a sideview relative to the frontview shown in FIG. 2. FIG. 3 illustrates the first radar beam pattern 14 as defining a first direction 36 that is illustrated as being substantially horizontal, and the second radar beam pattern 18 as defining a second direction 38 that is illustrated as being angled at about 45 degrees relative to the first direction 36. As suggested by the illustration, both radar beam patterns may pass through the about same surface region on the vehicle 12, illustrated here as an area of a tail light lens 40 that is part of the taillight assembly 24.

The controller 34 may include a processor 42 such as a microprocessor or other control circuitry as should be evident to those in the art. The controller 34 may include memory (not shown), including nonvolatile memory, such as electrically erasable programmable readonly memory (EEPROM) for storing one or more routines, thresholds and captured data. The one or more routines may be executed by the processor 42 to perform steps for analyzing signals received by the controller 34 as described herein.

The controller 34 may include a first input 44 configured to receive a first antenna signal 46 from the antenna 22. The first antenna signal 46 is generally indicative of a first radar reflection from the first direction 36. The controller 34 may also include a second input 48 configured to receive a second antenna signal 50 from the antenna 22. The second antenna signal 50 is generally indicative of the second radar reflection from the second direction 38. Furthermore, the controller 34 may include a first output 52 configured to output a first transmit signal 54 for emitting electromagnetic energy in the first direction 36, and a second output 56 configured to output a second transmit signal 58 for emitting electromagnetic energy in the second direction 38.

As transmitted electromagnetic energy from the antenna 22 and reflected electromagnetic energy propagating toward the antenna 22 in both the first radar beam pattern 14 and the second radar beam pattern 18 pass through the tail light lens 40 at about the same area, the controller 34 or the processor 42 may be configured to determine that the first direction 36 is blocked by an obstruction proximate to the antenna location 16 based on the second antenna signal 50. In particular, and as will be described in more detail below, the second antenna signal 50 may be used to determine that there is something on the tail light lens 40 that may interfere with the system 10 being able to detect and/or accurately classify objects residing in the first radar beam pattern 14. For example, if the antenna 22 transmits electromagnetic energy in the second direction 38 in response to the second transmit signal 58, and no road surface reflection is indicated by the second antenna signal 50, either because the reflection was too close to detect, or the signal level of the reflection is less than the noise level or other suitable threshold, then there is an indication that there may be obstruction proximate to the antenna location 16 because the obstruction blocks/absorbs the transmitted energy, and/or blocks/absorbs reflections from the first direction 36 and the second direction 38. The system 10 may also be configured to activate an alert (not shown), for example sound an alarm, or activate a warning light if the controller 34 determines that the system 10 may not be able to detect an object residing in the first radar beam pattern 14.

Since the second radar beam pattern 18 is directed toward the roadway or ground near the vehicle 12, absent any obstructions or objects in the second radar beam pattern 18, the reflected signal detected by the antenna 22 and indicated in the second antenna signal 50 should be relatively consistent. In particular, the distance to the roadway surface and the amplitude of the reflected signal indicated by the second antenna signal 50, will typically be between predetermined thresholds when there is no obstruction in the second radar beam pattern 18, and the antenna 22 is not misaligned. As such, if the second signal amplitude (i.e. the amplitude of the second antenna signal 50) is less than a threshold, the controller 34 may determine a first signal loss or absorption factor of an obstruction based on a second signal amplitude.

In another embodiment, the system 10, or the controller 34, may be configured to determine a vertical alignment angle of the first direction 36, that is, how much the first direction 36 or the first radar beam pattern 14 deviates from horizontal. Knowing how much the first direction 36 deviates from horizontal may be an indication that the amplitude of reflected signals indicated in the first antenna signal 46 may be reduced. For example, if the first radar beam pattern is directed above horizontal, some of electromagnetic energy that should have been reflected by another vehicle may pass above the other vehicle and not be reflected. As such, the reflected signal may be weaker than normal and so without compensation for vertical misalignment, the reflection may not be properly identified as a vehicle. Furthermore, the amplitude of the reflected signal may correspond to a reflection produced by a smaller vehicle than is actually present, or the system may fail to detect smaller targets altogether. Once vertical misalignment is detected, the system could be electrically or mechanically realigned. Alternatively, for example if it is not possible to realign the antenna, a warning could be activated as described in more detail below.

Given the radar mounting height above the road surface, an expected range to the road surface indicated by the second antenna signal 50 may be predetermined. Assuming that the angle between the first direction 36 and the second direction 38 is fixed by the design of the antenna 22, if the second antenna signal 50 indicates that the distance to the roadway is greater than expected, it may be an indication that the first direction 36 is pointing above a horizontal plane about the vehicle 12 by a proportional amount. Likewise, if the second antenna signal 50 indicates that the distance to the roadway is less than expected, this may be an indication that the first direction 36 is pointing below the horizontal plane about the vehicle 12 by a proportional amount. The elevation angle of the second direction 38, and by inference, the elevation or vertical misalignment of the first direction 36, may be determined using Equation 1, $$\Delta\emptyset R = \arcsin((R\exp/R\mathrm{act})*\sin(\emptyset\exp))-\emptyset\exp \qquad \text{Eq. 1}$$

where, $\Delta\emptyset R$=estimated vertical misalignment of beam based on range offset, Rexp=expected distance to the roadway, Ract=actual distance to the roadway, and $\emptyset$exp=expected elevation angle of beam.

It was recognized that the second antenna signal may also be affected by the speed of the vehicle 12. As such, vehicle speed may be used to determine an expected Doppler shift of the reflected signal and thereby determine the vertical misalignment based on the difference between an expected and measured Doppler. It was further recognized that the second antenna signal 50 may be compensated for vehicle speed, and so the first antenna signal 46 may be compensated based on the second antenna signal 50 and a vehicle speed. The effects on signals related to vehicle speed may be comparable to the effects of vertical misalignment. For example, given vehicle speed and the presumed orientation of the radar beam, there is an expected Doppler effect to the road surface reflection. So in a manner similar to the expected range described above, if the second antenna signal 50 indicates a Doppler effect to the road surface reflection that is greater than expected, this may indicate that the first direction 36 is above a horizontal plane Likewise, if the range or Doppler is less than expected, this may indicate that the first direction 36 is pointed down below the horizontal plane. The elevation direction of the second direction 38, and by inference, the elevation or vertical misalignment of the first direction 36 may be determined using Equation 2, $$\Delta\emptyset D = (-1*\arccos((D\mathrm{act}/D\exp)*\cos(\emptyset\exp)))-\emptyset\exp \qquad \text{Eq. 2}$$

where,

ΔØD=estimated vertical misalignment of beam based on Doppler offset,

Dexp=expected Doppler effect to the road surface reflection,

Dact=actual Doppler effect to the roadway surface reflection, and

Øexp=expected elevation angle of beam.

It should be apparent that either range or Doppler may be used to detect vertical misalignment, or the two estimates can be combined for better accuracy. The controller 34 may receive an indication of vehicle speed from the vehicle 12 by way of a vehicle speed signal (not shown) as is known in the art. Alternatively, the vehicle speed may be estimated by determining the rate that objects detected in the first antenna signal 46, and classified as fixed objects, recede away from the vehicle 12

Figure 4:
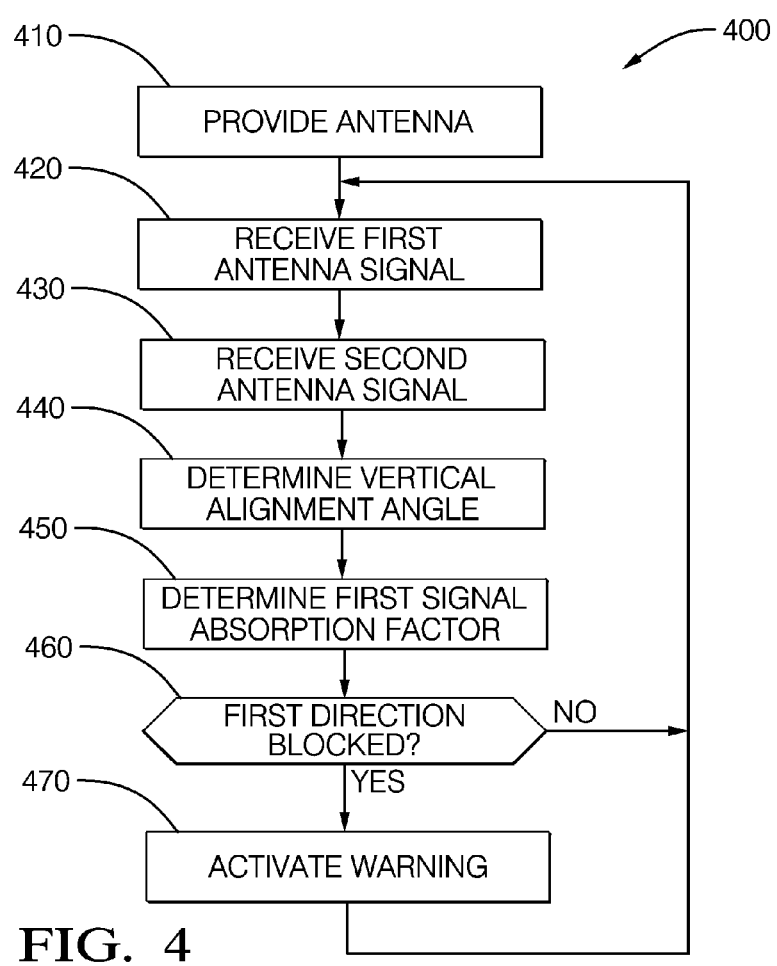
FIG. 4 is a flow chart of a method of operating the radar system of FIG. 1 in accordance with one embodiment.

FIG. 4 illustrates a method 400 of operating a ground vehicle radar system 10. Step 410, PROVIDE ANTENNA, may include providing an antenna 22 configured to be installed at an antenna location 16 on a ground vehicle 12 for detecting objects about the ground vehicle 12, said antenna 22 configured to detect objects in a first direction 36 characterized as being substantially parallel to a horizontal plane about the ground vehicle 12, and to detect objects in a second direction 38 characterized as being toward a location on a roadway surface proximate to the ground vehicle 12.

Step 420, RECEIVE FIRST ANTENNA SIGNAL, may include receiving a first antenna signal 46 from the antenna 22 by the controller 34.

Step 430, RECEIVE SECOND ANTENNA SIGNAL, may include receiving a second antenna signal 50 from the antenna 22 by the controller 34.

Step 440, DETERMINE VERTICAL ALIGNMENT ANGLE, may include determining a vertical alignment angle based on a difference between a horizontal plane about the vehicle 12 and the first direction 36 based on the second antenna signal 50. The first antenna signal 46 and/or the second antenna signal 50 may be compensated or corrected for variations in vehicle speed. In one embodiment, the step of determining the vertical alignment angle includes determining a difference between the second antenna signal and an expected antenna signal in either measured range or Doppler or both. In one embodiment, the step of determining the vehicle speed may be based on an analysis of movement by objects detected by the first antenna signal 46.

Step 450, DETERMINE FIRST SIGNAL ABSORPTION FACTOR, or loss factor may include determining a first signal absorption or loss factor of an obstruction based on a second signal amplitude, that is, the amplitude of the reflected signal indicated in second antenna signal 50. The obstruction factor may be used to determine if the radar detection range has been compromised and then serve as a basis to issue a warning. Also, a total signal loss factor that combines absorption losses and reflection signal reductions may be determined. This obstruction factor may be used to correct or compensate the amplitude characteristics of the first antenna signal 46 for any reduction of amplitude caused by the obstruction. For example, if the amplitude of the second signal amplitude is half of what is typically received, or half of what is expected, then the amplitude characteristics of the first antenna signal 46 may be doubled by the processor 42 when the first antenna signal 46 is analyzed.

Step 460, FIRST DIRECTION BLOCKED?, may include determining when the first direction is blocked by an obstruction proximate to the antenna location based on the second antenna signal. As used herein, blocked means that any signal received by the antenna 22 and indicated by the first antenna signal 46 may not provide a reliable indication of another vehicle proximate to the ground vehicle 12. If the signal is not determined to be blocked, the first antenna signal 46 may be further processed to determine if there is another vehicle or other object that warrants notifying the operator of the vehicle 12. This notification may be in the form of an illuminated indicator on the dashboard of the vehicle 12, or an audible alarm sounded within the interior of the vehicle 12.

Step 470, ACTIVATE WARNING, may include sounding an alarm or lighting an indictor (not shown) so the operator of the vehicle 12 knows that there may be an object or other vehicle proximate to the vehicle 12 that may not be detected, and so the operator should take care when, for example, changing lanes, and/or that the operator should stop the vehicle 12 and clear any obstructions proximate to the antenna location 16. By way of example and not limitation, there may be two types of warnings. A blockage warning and/or vertical misalignment warning signal may be issued that is distinguishable from a warning signal that indicates that another vehicle in the blind spot. The blockage alarm may inform the driver that the radar is not able to detect targets and so it is unknown if there may or may not be another vehicle nearby. Likewise, the vertical misalignment warning signal may inform the driver that the radar is not able to detect targets.

Accordingly, a system 10, a controller 34 for the system 10 and a method 400 for detecting obstructions and misalignment of a ground vehicle radar is provided. Detection of blockage or obstruction and detection of vertical misalignment is provided for less cost when compared to other known systems. The blockage/obstruction detection is provided when the vehicle 12 is in motion or is stopped. A dedicated antenna beam defining the second radar beam pattern 18 is pointed at the road surface proximate to the vehicle 12 and is focused to isolate the road surface return from other objects in the environment. In this manner, the road surface provides a relatively stable target to use as a reference for detection of both blockage and vertical misalignment. Absence of the road surface return may indicate that the antenna 22 is completely blocked. The amplitude of the second antenna signal 50 relative the expected amplitude of the road surface return indicates a level of blockage or an obstruction factor.

Detection of vertical misalignment may be based on a rangeDoppler spectrum of the road surface return in the second radar beam pattern 18. The expected ranges of the second antenna signal 50 (road surface return) is determined based on the antenna mounting height above the roadway, and elevation angle of the second direction 38. The expected Doppler is determined based on the azimuth and elevation angle of the second radar beam pattern 18 as well as the speed of the vehicle 12. A change in vertical alignment of the second radar beam pattern 18 (blockage beam) causes a shift in the range and Doppler of the road surface spectrum received relative to an expected value. Hence, vertical misalignment may be determined from an offset between the detected range and Doppler and the expected range and Doppler of the second antenna signal 50.

The method 400 may also include estimating an expected range and Doppler of the road surface return in the blockage beam given pertinent radar parameters and the speed of vehicle 12. This establishes a window within which to search for the peak road surface return. The window serves to improve the isolation of the road surface return from, for example, reflections from other nearby objects in the sidelobes of the blockage beam.

The peak amplitude within the rangeDoppler window may be detected and the range and Doppler of the peak may be estimated using conventional target detection techniques. Spectral estimation techniques can also be used. The peak amplitude of the road surface may be averaged over time to reduce variability and subjected to various thresholds to determine the level of blockage and diagnostic status.

Vertical misalignment may be estimated based on an offset between the expected range and Doppler and the detected range and Doppler of the peak road surface return. The difference between the expected and detected rangeDoppler spectrums can be used as well. The estimated vertical misalignment is averaged over time to improve accuracy and subjected to a tolerance threshold to establish the diagnostic status. Alternatively, the offsets of the peak in range and Doppler and/or the offset of the rangeDoppler spectrum from the expected result can be averaged and then used to compute the vertical misalignment.

While this invention has been described in terms of the preferred embodiments thereof, it is not intended to be so limited, but rather only to the extent set forth in the claims that follow.

I claim:

1. A ground vehicle radar system configured to be installed on a ground vehicle, said system comprising:
    an antenna configured to be installed at an antenna location on the ground vehicle for detecting objects about the ground vehicle, said antenna configured to detect objects in a first direction characterized as being substantially parallel to a horizontal plane about the ground vehicle, and detect objects in a second direction characterized as being toward a location on a roadway surface proximate to the ground vehicle; and
    a controller configured to be coupled to the antenna effective to receive a first antenna signal indicative of a first radar reflection from an object located in the first direction, and a second antenna signal indicative of a second radar reflection from an object located in the second direction, wherein said controller is further configured to determine when the first direction is blocked by an obstruction proximate to the antenna location based on the second antenna signal, wherein said controller is further configured to determine a first signal absorption factor of an obstruction based on a second signal amplitude.

2. The system in accordance with claim 1, wherein said antenna comprises
    a first receive element configured to receive a first radar reflection from the first direction; and
    a second receive element configured to receive a second radar reflection from the second direction.

3. The system in accordance with claim 1, wherein the controller is further configured to determine a vertical alignment angle of the first direction based on the second antenna signal.

4. The system in accordance with claim 3, wherein said vertical alignment angle is determined based on a difference between the second antenna signal and an expected antenna signal.

5. The system in accordance with claim 1, wherein the controller is further configured to determine a vertical alignment angle of the first direction based on the second antenna signal and a vehicle speed.

6. The system in accordance with claim 5, wherein the controller is further configured to determine the vehicle speed based on the first antenna signal.

7. A controller for ground vehicle radar system, said controller comprising:
    a first input configured to receive a first antenna signal indicative of a first radar reflection from a first direction characterized as being substantially parallel to a horizontal plane about the ground vehicle;
    a second input configured to receive a second antenna signal indicative of the second radar reflection from a second direction characterized as being from a location on a roadway surface proximate to the ground vehicle; and
    a processor configured to determine that the first direction is blocked by an obstruction proximate to the antenna location based on the second antenna signal, wherein said processor is further configured to determine a first signal absorption factor of an obstruction based on a second signal amplitude.

8. The controller in accordance with claim 7, wherein said controller further comprises
    a first output configured to output a first transmit signal for emitting electromagnetic energy in the first direction; and
    a second output configured to output a second transmit signal for emitting electromagnetic energy in the second direction.

9. The controller in accordance with claim 7, wherein the processor is further configured to determine a vertical alignment angle of the first direction based on the second antenna signal and a vehicle speed.

10. The controller in accordance with claim 9, wherein the processor is further configured to determine the vehicle speed based on the first antenna signal.

11. A method of operating a ground vehicle radar system, said method comprising:
    providing an antenna configured to be installed at an antenna location on a ground vehicle for detecting objects about the ground vehicle, said antenna configured to detect objects in a first direction characterized as being substantially parallel to a horizontal plane about the ground vehicle, and detect objects in a second direction characterized as being toward a location on a roadway surface proximate to the ground vehicle;
    receiving a first antenna signal;
    receiving a second antenna signal; and
    determining when the first direction is blocked by an obstruction proximate to the antenna location based on the second antenna signal, wherein the step of determining when the first direction is blocked includes determining a first signal absorption factor of an obstruction based on a second signal amplitude.

12. The method in accordance with claim 11, said method further comprising determining a vertical alignment angle for the first direction based on the second antenna signal and a vehicle speed.

13. The method in accordance with claim 12, wherein the step of determining the vertical alignment angle includes determining a difference between the second antenna signal and an expected antenna signal.

14. The method in accordance with claim 12, wherein the step of determining the vehicle speed is based on the first antenna signal.

* * * * *